(12) United States Patent
Yamin

(10) Patent No.: US 9,491,931 B2
(45) Date of Patent: Nov. 15, 2016

(54) ANIMAL HARNESS DEVICE AND METHOD

(71) Applicant: Nancy Yamin, Eugene, OR (US)

(72) Inventor: Nancy Yamin, Eugene, OR (US)

( * ) Notice: Subject to any disclaimer, the term of this patent is extended or adjusted under 35 U.S.C. 154(b) by 304 days.

(21) Appl. No.: 14/320,983

(22) Filed: Jul. 1, 2014

(65) Prior Publication Data
US 2015/0007778 A1 Jan. 8, 2015

Related U.S. Application Data

(60) Provisional application No. 61/843,419, filed on Jul. 7, 2013.

(51) Int. Cl.
*A01K 27/00* (2006.01)
(52) U.S. Cl.
CPC ................. *A01K 27/002* (2013.01)
(58) Field of Classification Search
CPC .................................... A01K 27/002
USPC .............. 119/856, 863, 792; 54/70
See application file for complete search history.

(56) References Cited

U.S. PATENT DOCUMENTS

| 3,098,336 | A | | 7/1963 | Bearss | |
|---|---|---|---|---|---|
| 5,146,875 | A | * | 9/1992 | Bolt | A01K 27/007 119/654 |
| 5,471,953 | A | * | 12/1995 | Sporn | A01K 27/002 119/792 |
| 5,503,113 | A | | 4/1996 | Knight | |
| 5,611,298 | A | * | 3/1997 | Sporn | A01K 27/002 119/792 |
| 6,708,650 | B1 | * | 3/2004 | Yates | A01K 27/002 119/712 |
| 7,165,511 | B1 | | 1/2007 | Brezinski | |
| D599,504 | S | * | 9/2009 | Halip | D30/152 |
| 7,963,256 | B1 | | 6/2011 | Horgan | |
| 8,051,808 | B2 | | 11/2011 | Mugford | |
| 8,171,889 | B2 | * | 5/2012 | Lindfors | A01K 1/0236 119/412 |
| 2002/0033145 | A1 | * | 3/2002 | Clark | A01K 27/002 119/856 |
| 2004/0000273 | A1 | * | 1/2004 | Lady | A01K 27/002 119/792 |
| 2006/0102102 | A1 | * | 5/2006 | Bennett | A01K 27/002 119/792 |
| 2008/0105216 | A1 | | 5/2008 | Sporn | |
| 2011/0297105 | A1 | * | 12/2011 | Horiuchi | A01K 27/002 119/792 |
| 2014/0202398 | A1 | * | 7/2014 | Woodward | A01K 27/002 119/864 |
| 2016/0183496 | A1 | * | 6/2016 | Wilson | A01K 27/003 119/719 |

FOREIGN PATENT DOCUMENTS

| CN | 101755690 | | 3/2014 | | |
| JP | 10257833 | A * | 9/1998 | | |
| WO | WO 2006053233 | A2 * | 5/2006 | ........... | A01K 27/002 |

* cited by examiner

*Primary Examiner* — Son T Nguyen
(74) *Attorney, Agent, or Firm* — Michael A. Yamin

(57) ABSTRACT

A dog-training method includes a device having a left connector, a right connector, a back strap, a girth strap, and a chest strap. The chest strap at a first end couples to the right connector and a left second end passes through a center portion of the left connector and ends in a left-leash coupler which is larger than the center portion of the left connector so that the left-leash coupler cannot pass through the center portion of the left connector. The chest strap further includes a right free-moving strap coupled to the left connector with a right second end passing through a center portion of the right connector and terminating in a right-leash coupler that is configured larger than the center portion of the right connector so that the right-leash coupler cannot pass through the center portion of the right connector.

17 Claims, 6 Drawing Sheets

ANIMAL HARNESS DEVICE AND METHOD

PRIORITY CLAIM

The present application claims benefit under 35 USC Section 119(e) of U.S. Provisional Patent Application Ser. No. 61/843,419 filed on 2013 Jul. 7. The present application is based on and claims priority from this application, the disclosure of which is hereby expressly incorporated herein by reference.

FIELD OF THE INVENTION

The present invention relates to an improvement to a harness for use with domestic animals. More specifically, the invention relates to a dog harness utilizing a double-ended leash to control and correct a dog's walk to reduce or eliminate the animal from pulling on the leash during walks.

BACKGROUND

Pet owners often use a harness with a leash when walking an animal. Harnesses are particularly useful for dogs and other animals that may pull while being walked, as the harness provides a means to take the pressure off the neck of the animal, in contrast to the use of a collar with a leash.

One conventional harness, described by Knight in U.S. Pat. No. 5,503,113 (issued on Apr. 2, 1996), includes a cinch band extending about the forward portion of the animal's torso (chest) with a portion of the band projecting upwardly through a ring for reception of a leash. Accordingly, leash-imparted forces close the cinch band about the animal's chest and a pair of shoulder straps is drawn rearwardly against the animal's shoulders.

Another known harness, described by Brezinski in U.S. Pat. No. 7,165,511 (issued on Jan. 23, 2007), includes a first strap and second strap connected at opposite ends to connectors. A single center chest strap extends between the first and second straps. A flexible restraining strap loops between the connectors for attaching a single ended leash. Thus, when the animal pulls forward, the leash resists oppositely resulting in a decrease in the diameter of the girth strap, transferring the animal's pull to a compression of the rib-cage region of the dog.

Yet another known harness, described by Horgan in U.S. Pat. No. 7,963,256 (issued on Jun. 21, 2011) includes connectors for attaching a double-ended leash. This harness consists of a conventional adjustable dog harness and an attached harness control extension. The harness control extension includes a plurality of straps configured to extend to the hind end of the dog and a motion control cord that is interlaced in and between the conventional adjustable dog harness and the harness control extension. The motion control cord encircles the dog's hind legs and can be tightened around the thighs with minimal force, where such tightening substantially restrains the dog without causing injury to the dog.

A common limitation of known harnesses includes properly adjusting the restraining harnesses of the known art. Proper adjustment of a front-clip restraining harness is needed so that when a dog pulls, the reacting force along the leash causes the animal to turn to the left or the right (depending on which side the handler is walking). However, if the harness is loose, the harness will rotate and the dog will not be redirected. Oppositely, if the harness is too tight, the dog will be uncomfortable and unable to walk normally in a straight line, thus making the too-tight harness useless for training. Rear clip restraining harnesses do not redirect a pulling dog to the left or the right, so such harnesses do not work to control and re-train a pulling dog to stop pulling on a walk.

Further, the known restraining harnesses in the art include a single point of attachment for the leash to the harness. This single attachment point requires proper fitting of the harness to the dog for proper redirecting of the dog when it pulls during a walk, as described above. Moreover, a leash attached to a single location on the harness does not allow for adequate control of the animal's movement. Moreover, the fixed nature of the straps of a typical harness does not allow any transmission of the force of pull on the leash into meaningful guidance for the animal to not pull.

Therefore, there remains a need for an improved training method that utilizes an improved harness. Such an improved harness should de-emphasize the difficulty and need for precise fitting of the harness to the dog and allow for some self-fitting so that expertise in fitting a harness to a particular dog is minimized or eliminated. Further, there is a need for a harness that more effectively redirects the forward pulling of the dog-not by physically turning the dog-by changing the dog's own behavior by constricting movement in the direction of the dog's pull (whether it be forward, left, or right) by placing pressure across the chest to the opposite side to redirect or deter that behavior.

SUMMARY OF THE INVENTION

This invention is directed to an improved harness that in combination with a double-ended leash, readily transmits to the animal forces that provide a correct instruction on walking forward and not pulling forward, not pulling to the right or not pulling to the left. The harness device of the present invention balances the tension created by a pulling animal to cause the animal to not pull. In addition, the inventive harness makes the animal easier to handle.

One embodiment of the present invention contemplates a harness for training or controlling the pulling or turning of a companion animal, the harness comprising means for exerting forces across the chest of the animal, the harness comprising (a) a back strap configured to be positioned across a back of the animal at or behind its shoulders; (b) a girth strap configured to be positioned around a girth of the animal behind the front legs on an underside of the animal, wherein one end of each of the back strap and girth strap are fixedly but optionally removably joined together on the right side of the animal at a right O-ring, and the other end of each of the back strap and girth strap are fixedly but optionally removably joined together on the left side of the animal at a left O-ring, and wherein the girth strap and back strap are of such relative length so as to place the left O-ring and right O-ring on the left side and the right of the animal on or behind the shoulders of the animal; (c) the left O-ring providing means for attaching a right chest strap and for providing passing means for a left chest strap there through, and the right O-ring providing means for attaching a left chest strap and for providing passing means for a right chest strap there through; and (d) a left chest strap and a right chest strap, the left chest strap attached to the right O-ring, passing across the chest of the animal, passing through the right O-ring and terminating at the left leash attachment ring; and a right chest strap attached to the left O-ring, passing across the chest of the animal, passing through the right O-ring and terminating at the right leash attachment ring, said each leash attachment ring providing means for attaching an end of a double-ended leash thereto, and the leash attachment ring further comprising a size to prevent the leash attachment ring from passing through the O-ring.

Further, this harness attaches to a leash attachment clasp at each end of a double-ended leash.

This harness is further configured wherein when the double-ended leash held in a position to provide a taught connection from the position of holding to each of the leash attachment rings, the pulling of the animal forward, left or right exerts a force on one or both chest straps, the force providing a signal to the animal to stop pulling.

This embodiment further includes a harness wherein the left chest strap and the right chest strap are a continuous strap after passing through each of the O-rings.

One contemplated method includes a method for training or controlling the pulling or turning of a companion animal using a harness comprising means for exerting a lateral force at the chest opposite to the direction of pulling. This method utilizes a harness comprising (a) a back strap configured to be positioned across a back of the animal at or behind its shoulders; (b) a girth strap configured to be positioned around a girth of the animal behind the front legs on an underside of the animal, wherein one end of each of the back strap and girth strap are fixedly but optionally removably joined together on the right side of the animal at a right O-ring, and the other end of each of the back strap and girth strap are fixedly but optionally removably joined together on the left side of the animal at a left O-ring, and wherein the girth strap and back strap are of such relative length so as to place the left O-ring and right O-ring on the left side and the right of the animal on or behind the shoulders of the animal; (c) the left O-ring providing means for attaching a right chest strap and for providing passing means for a left chest strap there through, and the right O-ring providing means for attaching a left chest strap and for providing passing means for a right chest strap there through; and (d) a left chest strap and a right chest strap, the left chest strap attached to the right O-ring, passing across the chest of the animal, passing through the right O-ring and terminating at the left leash attachment ring; and a right chest strap attached to the left O-ring, passing across the chest of the animal, passing through the right O-ring and terminating at the right leash attachment ring, said each leash attachment ring providing means for attaching an end of a double-ended leash thereto, and the leash attachment ring further comprising a size to prevent the leash attachment ring from passing through the O-ring; and wherein when each end of a double-ended leash is attached to each leash attachment ring and the double-ended leash held in a position to provide a taught connection from the position of holding to each of the leash attachment rings, the pulling of the animal forward, left or right exerts a force on one or both chest straps, the force providing a signal to the animal to stop pulling.

This method further contemplates that each end of a double-ended leash is attached to each leash attachment ring.

This method further includes wherein when the double-ended leash held in a position to provide a taught connection from the position of holding to each of the leash attachment rings, the pulling of the animal forward, left or right exerts a force on one or both chest straps, the force providing a signal to the animal to stop pulling.

This method further includes wherein the left chest strap and the right chest strap are a continuous strap after passing through each of the O-rings, the continuous strap being of sufficient length to extend to and from the hand of a person walking the dog, thus effectively forming the double-ended leash described above, or, in another embodiment, not so far extending but having a means for attaching to a typical leash, for example, having a leash attachment connector at its midpoint, thus effectively forming the linking band described further below.

Another contemplated embodiment of the present invention includes a harness for training or controlling the pulling or turning of a companion animal, the harness comprising means for exerting forces across the chest of the animal, the harness comprising (a) a back strap configured to be positioned across a back of the animal at or behind its shoulders; (b) a girth strap configured to be positioned around a girth of the animal behind the front legs on an underside of the animal, wherein one end of each of the back strap and girth strap are fixedly but optionally removably joined together on the right side of the animal at a right O-ring, and the other end of each of the back strap and girth strap are fixedly but optionally removably joined together on the left side of the animal at a left O-ring, and wherein the girth strap and back strap are of such relative length so as to place the left O-ring and right O-ring on the left side and the right of the animal on or behind the shoulders of the animal; (c) the right and left O-ring providing passing means for a chest strap there through, the chest strap having a left end and a right end; and (d) a chest strap passing across the chest of the animal, the right end passing through the right O-ring and terminating at the right leash attachment ring; and the left end passing through the left O-ring and terminating at the left leash attachment ring, said each leash attachment ring providing means for attaching an end of a double-ended leash thereto, and the leash attachment ring further comprising a size to prevent the leash attachment ring from passing through the O-ring.

This harness further includes wherein each end of a double-ended leash is attached to each leash attachment ring.

This harness further includes wherein when the double-ended leash held in a position to provide a taught connection from the position of holding to each of the leash attachment rings, the pulling of the animal forward, left or right exerts a force on one or both chest straps, the force providing a signal to the animal to stop pulling.

Further, the harness further includes wherein the chest strap is a continuous strap after passing through each of the O-rings, the continuous strap being of sufficient length to extend to and from the hand of a person walking the dog, thus effectively forming the double-ended leash described above, or, in another embodiment, not so far extending but having a means for attaching to a typical leash, for example, having a leash attachment connector at its midpoint, thus effectively forming the linking band described further below.

Yet another method of the present invention includes a method for training or controlling the pulling or turning of a companion animal, the harness comprising means for exerting a lateral force at the chest opposite to the direction of pulling.

This method further utilizes the harness comprising (a) a back strap configured to be positioned across a back of the animal at or behind its shoulders; (b) a girth strap configured to be positioned around a girth of the animal behind the front legs on an underside of the animal, wherein one end of each of the back strap and girth strap are fixedly but optionally removably joined together on the right side of the animal at a right O-ring, and the other end of each of the back strap and girth strap are fixedly but optionally removably joined together on the left side of the animal at a left O-ring, and wherein the girth strap and back strap are of such relative length so as to place the left O-ring and right O-ring on the left side and the right of the animal on or behind the shoulders of the animal; (c) the right and left O-ring providing passing means for a chest strap, the chest strap having a left end and a right end; and (d) a chest strap passing across the chest of the animal, the right end passing through the right O-ring and terminating at the right leash attachment ring; and the left end passing through the left O-ring and terminating at the left leash attachment ring, said each leash attachment ring providing means for attaching an end of a double-ended leash thereto, and the leash attachment ring further comprising a size to prevent the leash attachment ring from passing through the O-ring.

Further, when each end of a double-ended leash is attached to each leash attachment ring and the double-ended leash held in a position to provide a taught connection from the position of holding to each of the leash attachment rings, the pulling of the animal forward, left or right exerts a force on the chest strap, the force providing a signal to the animal to stop pulling.

The method further includes wherein each end of a double-ended leash is attached to each leash attachment ring.

The method wherein when the double-ended leash held in a position to provide a taught connection from the position of holding to each of the leash attachment rings, the pulling of the animal forward, left or right exerts a force on the chest strap, the force providing a signal to the animal to stop pulling.

The method wherein the chest strap and the double-ended leash are a continuous strap after passing through each of the O-ring, the continuous strap being of sufficient length to extend to and from the hand of a person walking the dog, thus effectively forming the double-ended leash described above, or, in another embodiment, not so far extending but having a means for attaching to a typical leash, for example, having a leash attachment connector at its midpoint, thus effectively forming the linking band described further below.

DRAWING

DESCRIPTION OF THE INVENTION

Figure 1:
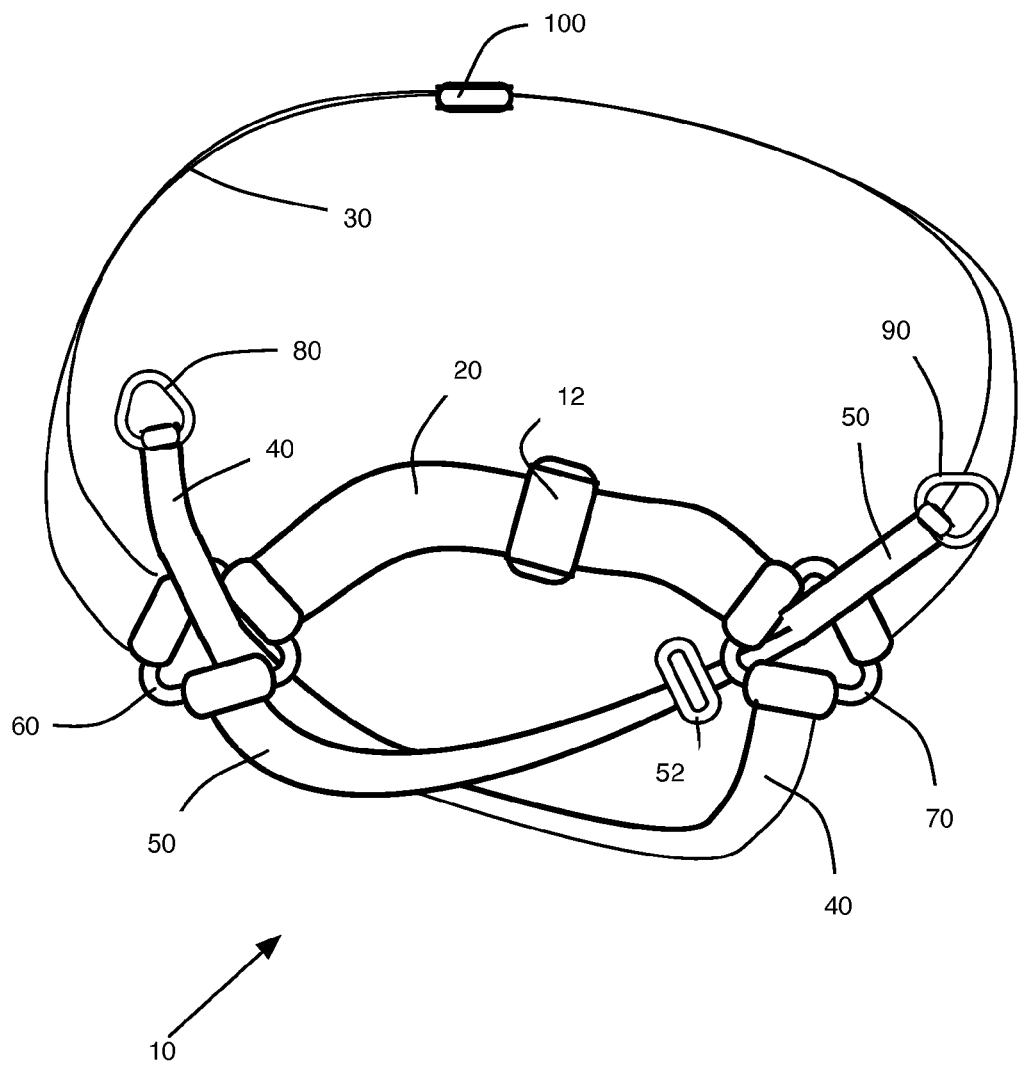
FIG. 1 is a front view of a harness according to a preferred embodiment of the present invention.
Figure 2:
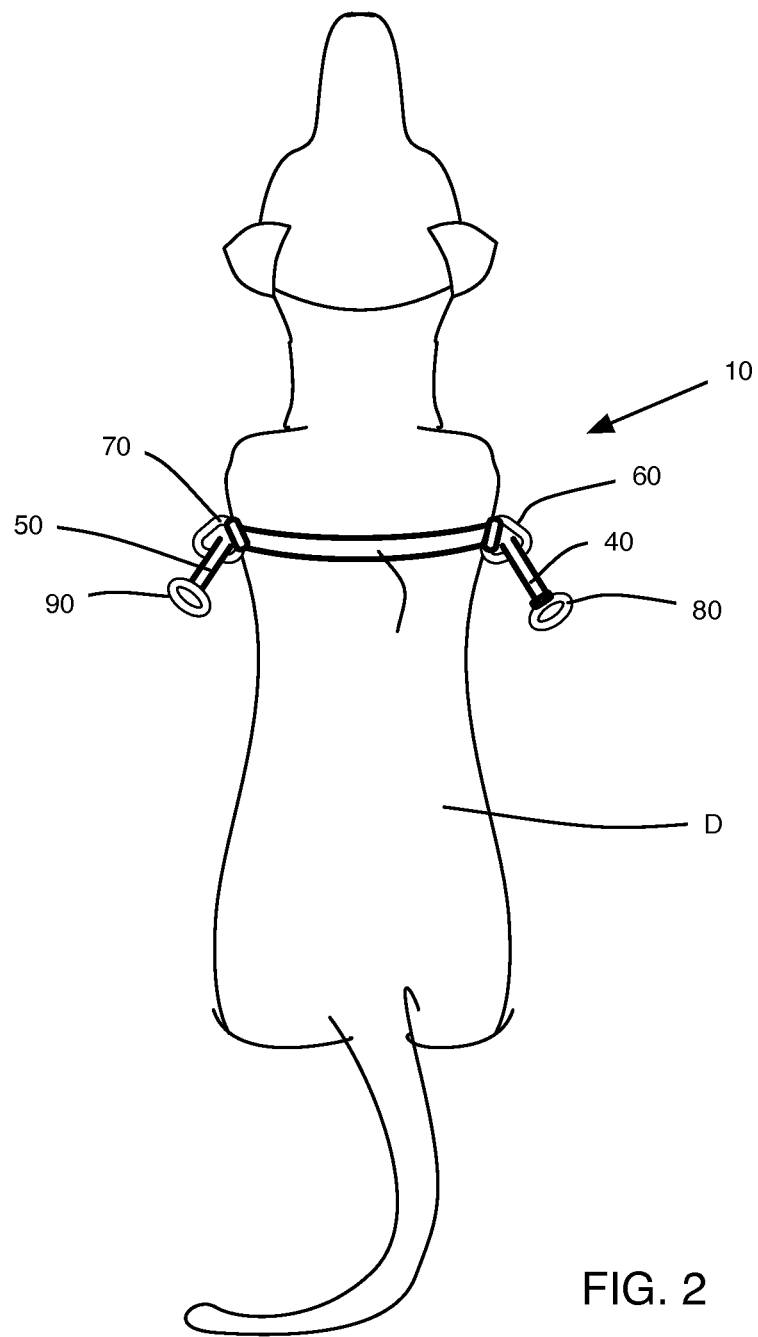
FIG. 2 is a top view of the harness of FIG. 1 arranged on a dog.
Figure 3:
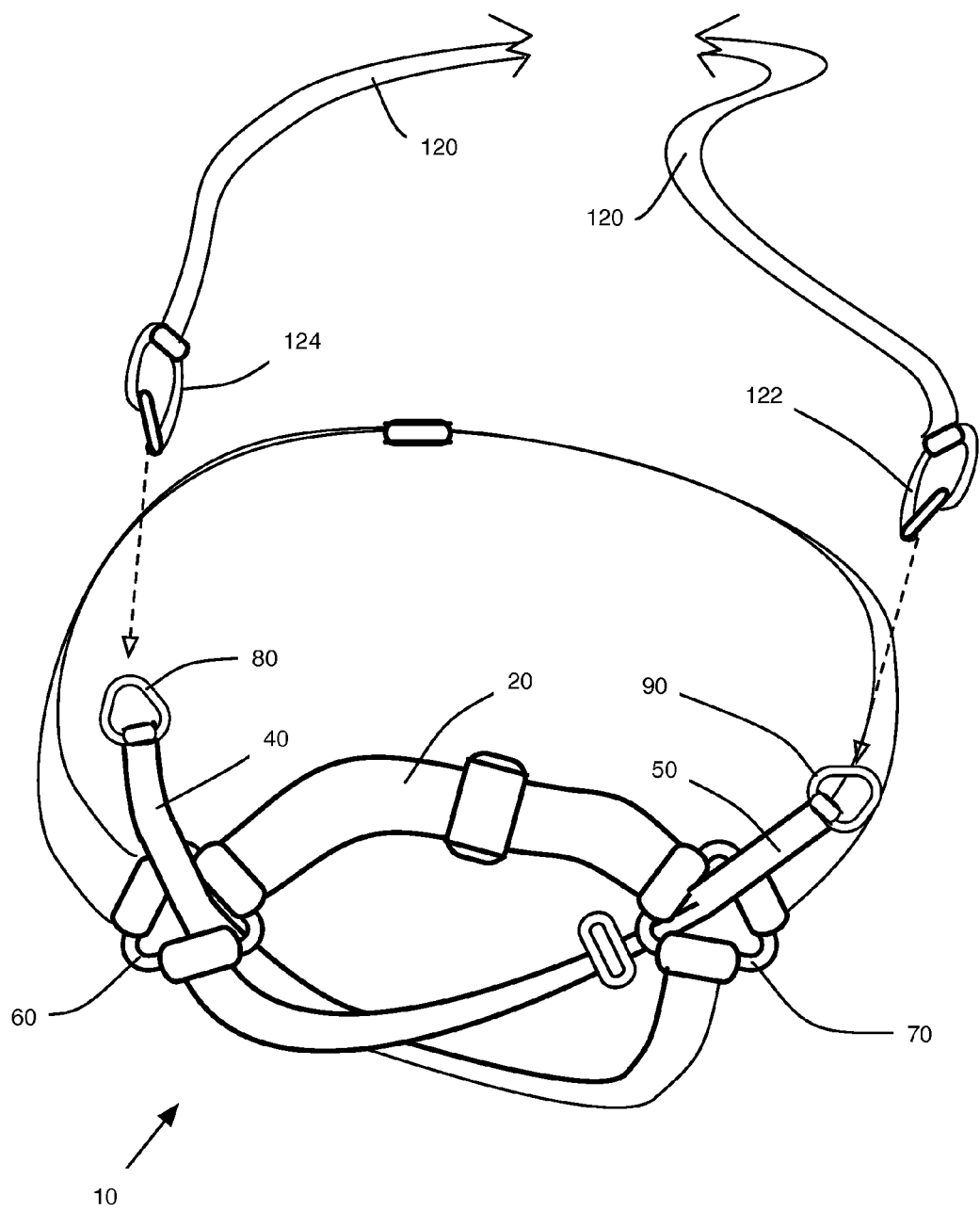
FIG. 3 is front view of the harness of FIG. 1 including a double-ended leash.
Figure 4:
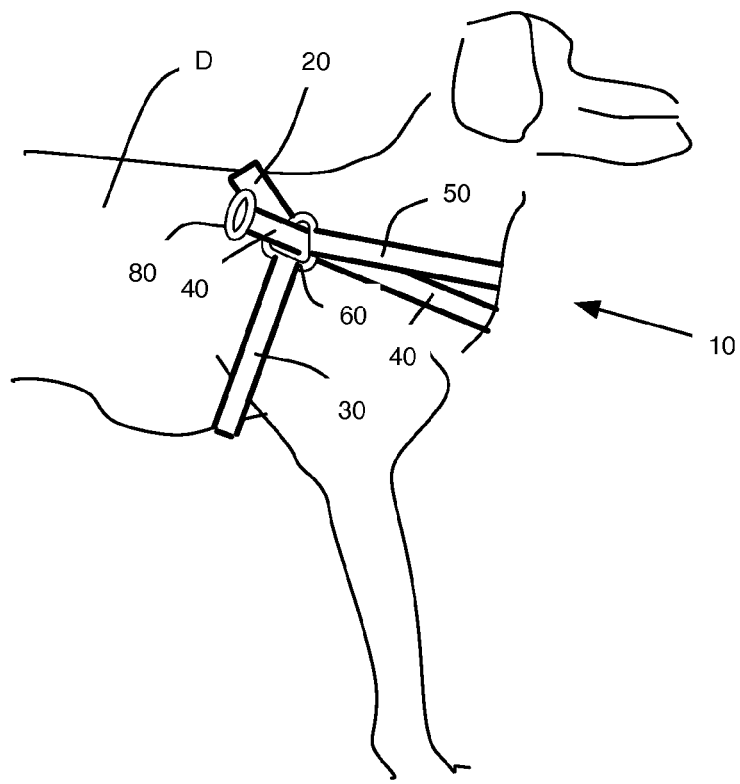
FIG. 4 is right side profile view of the harness of FIG. 1 arranged on a dog.

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

In some embodiments, a connector is termed an O-ring: This is mere convenience and the reader is cautioned from imparting limitations to the connector particularly to the shape and configuration and construction. Those skilled in the art will understand that connectors can be round, oval, triangular, square, or other shapes and can be made from steel, aluminum, alloys, composites, plastics, or other materials. Further, those skilled in the art will appreciate that the connectors can be replaced with other means of coupling the straps to each other, such as mechanically sewing the straps together, or where practical, two straps may be combined into a single strap, such as the back and girth straps, and therefore omitting the connectors, for example. Other configurations of straps and the coupling of straps together are included in the scope and spirit of this invention.

In one embodiment, a harness comprises four straps, each strap may be adjustable in length by means of a length-adjustable buckle or clasp, or each may be of fixed size for a particular sized animal. A dog is depicted in this illustration. A back strap fits over the top of the back, and a girth strap completes the back strap wrapping around the underside of the dog behind the front legs. These two straps are connected to each other with two connectors, such as an O-ring, to form a complete circle around the girth of the dog: a right O-ring on the right side and a left O-ring on the left side. The connections between the ends of girth strap and ends of back strap to the O-ring do not block the openings in the O-ring, and these straps are optionally removable from the O-ring. The third and fourth straps are a right chest strap and left chest strap (these are also called a left and right free-moving strap, respectively). The right chest strap is fixedly attached to the left O-ring, passes across the chest of the animal, and passes freely through the right O-ring (right connector), and terminates at the right leash attachment ring.

The left chest strap (free-moving strap) is fixedly attached (coupled) to the right O-ring, passes across the chest of the animal, and passes freely through the left O-ring (connector) and terminates at left leash attachment ring. The right and left leash attachment rings can each be an O-ring or similarly shaped piece (for example, the connector can be triangular, ovoid, square, rectangular, or other such shapes); however, the right and left leash attachment rings are of sufficient size to not be able to pass through the center of the respective right and left O-rings (connectors). Thus, the right chest strap and left chest strap are each affixed at a shoulder, pass in opposite directions across the chest, pass through the opposite side's O-ring, and terminate at its respective leash attachment ring. Thus, each of the left and right O-ring, in addition to connecting the back and girth straps, provide a fixed attachment point for one chest strap, and also a guide for the other chest strap to freely pass through it and terminate at the respective leash attachment ring. As mentioned above, leash attachment rings cannot pass through right and left O-rings thereby maintaining the configuration of the harness when it is removed from the dog, facilitating mounting on the dog with the various straps in place, and also facilitating attaching and detaching a leash thereto.

A double-ended leash can be used with the harness. A double-ended leash has a clip or clasp at the end of each its left leash end and its right leash end. The clip at the left leash end is for removably attaching to one of the two leash attachment rings and the clip at right leash end is for removably attaching to the other leash attachment ring.

The harness is mounted on the dog such that the chest straps pass in opposite directions across the chest and pass through their respective O-ring. A double-ended leash is attached to each of the leash attachment rings and the leash is held near the middle by hand, or held by two hands one on each side of leash. The position on the leash where it is so grasped will depend on how far to the side or back the walker is positioned relative to the dog: if the leash is held to the side of the dog, one end will be shorter than the other to extend to the near and far leash attachment rings, respectively; if the leash is held directly behind the dog, the ends of the leashes may be about the same length.

As the dog moves forward, the leash tightens. If the dog pulls forward an inappropriate amount, the leash and leash ends tighten, and the force of the pull transmitted through both leash ends through the leash attachment rings to both chest straps, exerting a force on both chest straps at the chest of the dog. Additional forces may be exerted at the O-ring to which the chest straps are fixedly attached. With use, the dog will stop pulling because the chest straps tighten. In another embodiment, if the dog pulls to the left or right, the harness provides a balancing response that guides the dog back into a perfect walking posture, as follows: If the dog pulls to the right, the left leash end and the left chest strap attached thereto will tighten, transmitting the tightness across the left chest strap. Some forward force on the O-ring connector is also transmitted by the tighter chest strap. Thus, the animal detects the tightness of the left chest strap and responds by stopping the pulling to the right and walking straight resumes. In contrast, if the dog pulls to the left, the right leash end and the right chest strap attached thereto will become tighter, transmitting the tightness across the chest strap. Some forward force on the O-ring connector may also be transmitted by the tighter chest strap. Thus, the animal detects the tightness of the right chest strap and responds by stopping the pulling to the left and walking straight resumes.

Various alternate embodiments of a harness are encompassed herein. These embodiments retain the means by which the harness operates, but may have different configurations. Each of the straps may have length-adjusting buckles or other adjustment means for customizing the harness to fit a particular size animal. These buckles may be positioned in the center of the straps or near or at their attachment points as described above; in the case of the chest straps, the adjustment buckles are optimally positioned so they do not overlap on the chest or otherwise contact each other during the use of the harness and when the dog may pull left or right. In another embodiment, the length of segment of a chest strap that extends between the O-ring and the leash attachment ring may be adjusted to be of sufficient length such that when the dog turns sharply and the chest strap pulls, the opposite leash attachment ring does not reach the corresponding O-ring and become stopped. In other embodiments, the leash attachment ring can contact the O-ring during pulling, and stop further movement of the chest strap, providing another force to correct improper pulling behavior.

In one embodiment the left and right O-ring can be used to secure the girth strap, back strap, and the end of each chest strap that is fixed at that O-ring, and the opening of that O-ring can provide the passageway for the chest strap that passes there through. In another embodiment, each O-ring may have an additional passageway or loop for the other chest strap to freely pass through, such that the girth, back and fixed ends of the chest strap are attached to one part of the O-ring, and the additional passageway or loop of the O-ring is provided for the chest strap to freely pass through. In one embodiment, the additional loop may be positioned at an angle, for example, a right angle, such that the additional loop extends out from the shoulder or side of the dog to allow the chest strap to freely pass through it and not become blocked by pressure against the shoulder of the dog or by the O-ring flattened against the shoulder of the dog.

While O-ring is used to describe this part of the harness, it can be of any shape to achieve its intended purpose. One of skill in the art can envision this O-ring in any of a number of configurations with the requirement that it secure the girth and back strap and one chest strap, and allow the chest strap secured on the opposite O-ring to freely pass through it.

Although the leash attachment rings are simply a means for connecting a chest strap to the leash, and are not essential components of the harness, they provide a facile means of separating the leash ends from the harness so that the harness can easily be mounted on the dog without the leash ends getting in the way, and if the dog is permitted to run around without a leash, a means for quickly detaching the double-ended leash. Furthermore, the leash attachment rings are provided so that they are not able to pass through the O-ring, so that the harness retains its basic configuration when not mounted on the dog. The length of chest strap between the O-ring and the leash attachment ring is provided so that the movements of the dog in normal and pulling situations do not result in the over-travel band tightening against the O-ring, although in some embodiments the tightening can provide an additional force and signal to stop pulling, as described above.

Having the double-ended leash detachable from the left and right leash attachment rings permits the dog to be detached from the leash for unaccompanied walking. However, variations on the design with regard to the detachability of various components are contemplated herein.

In one embodiment, the right and left chest straps are non-removably attached to their respective O-ring. In another embodiment, the double-ended leash and harness are provided as a single unit, wherein the left chest strap and right chest strap, after passing through their respective O-ring, continue as a loop, the middle of the loop providing a grasping point for the walker, in the same manner as described above. In this embodiment, the ends of the chest straps are fixedly attached to their respective O-ring, but are optionally removable. In another variation of this embodiment, enlargements at the positions where a left and right leash attachment ring would be located in other embodiments are provided merely to keep the loose chest straps from passing too far towards the chest of the animal, in particular when the harness is not mounted, to maintain the shape and relative strap positions for ease of mounting. In this embodiment, the left chest strap and right chest strap are essentially combined into a single, double-ended leash, each end passing through one O-ring, across the chest and fixedly attached to the opposite side O-ring. This unitary design of the harness in combination with the leash is another embodiment that provides an alternative design. In another embodiment, the loop is not so long as to extend as a holdable leash but shorter (although it could be used as a grab handle for a person to control the dog, but it is not what would be termed a lead or leash-length), and having a means for attaching to a typical leash, for example, having a leash attachment connector at its midpoint, thus effectively forming the linking band described further below.

In another embodiment a single chest strap is employed. The chest strap passes freely through both the left O-ring and right O-ring, and each end terminates at the left leash attachment ring and the right leash attachment ring, the latter parts having the same designs and functions as in other embodiments described herein. The leash attachment rings are provided to attach the double-ended leash, and the leash attachment rings are of sufficient size to not pass forward through the respective O-ring toward the chest. Use of this harness also provides balance and control of the dog. The length of chest strap between the O-ring and the leash attachment means on each side is short so that when the dog pulls in one direction, the chest strap can move until one leash attachment ring touches the O-ring at which point it cannot travel further, and the forces on the chest strap signal the dog to stop pulling to the side and walk straight. Pulling forward puts forces on the chest strap and signals the dog to stop pulling.

In another embodiment, a method is provided for controlling the motion of a walking animal and balancing any pulling forward, pulling or turning to the left, or pulling or turning to the right. In this embodiment, a method is provided for exerting a force at the chest in response to the pulling. Means for providing the force at the chest is provided by a force applying means affixed to a shoulder of the animal, said force applying means passing across the front of the chest and passing towards the back of the animal on the opposite side, said means terminating in a hand-held leash. In addition, an identical but mirror-image means is provided at the opposite shoulder, thus providing a force at the chest when the animal turns to the left or the right, each chest strap responsive to a pull in one direction. If the animal pulls right, one chest strap signals; if the animal pulls left, it is the other chest strap. If the animal pulls forward, both means for exerting a force at the chest occur simultaneously. Through these forces, the animal senses the forces and the gait comes into balance.

In the embodiment with a single chest strap, a method if similarly provided by use of the single chest strap to provided forces when the dog pulls forward, and the force from a left or right pulling provided when the force of the pull causes the leash attachment ring on one side of the animal to move against the O-ring on the same side, then tightening the chest strap from that side and signaling the dog to stop pulling to the side.

While not bound to theory, one can contrast the present invention with traditional reins used to control animal behavior. Reins extend from the right side of the animal to the right hand of the trainer, and the left side of the animal to the left hand, such that force applied to a rein provides a rearward force on the same side of the animal. In contrast, by means of the chest straps passing in front of the animal across the chest from either shoulder, the force on any "rein" is exerted on the chest from the opposite shoulder, thus opposite to that of traditional reins. Furthermore, the harness of the instant invention operates passively; i.e., the pulling or asymmetric movement of the dog on a taught, double-ended leash generates the force to signal the dog to correct its pulling, without the handler needing to decide which side to pull. Thus, control of the gait is achieved without any oral or verbal commands or any differential pulling on either side of the double-ended leash.

Accordingly, the combination of the leash and the harness provides a facile means to control a pulling dog. To facilitate attaching the harness to the dog, the back strap or girth strap, or both, can have a detachable clasp so that the strap can be opened and closed. Means for making the harness easy to detach, attach and adjust the size by the placement of open-close clasps and/or length adjustment devices are not limiting and the skilled artisan can readily design a harness embodied herein.

The straps comprising the girth, back and chest straps can be made of a woven fabric, leather, or synthetic material, similar to that used for animal harnesses, leashes, and other straps well-known to the skilled artisan. Depending on the size of the dog, wider or narrower straps may be appropriate.

The harness can be used or adapted for any animal to be walked, preferably a mammalian animal, and in particular domesticated companion animals such as dogs and cats, but can readily be adapted for any animal and may also be used to control movement of livestock animals and sports animals by the inventive counter passing of the chest straps as described herein.

FIGS. 1-6 illustrate a preferred embodiment of the present invention consisting of a harness device particularly well-suited for use in training a dog to walk without pulling on the leash or darting left and right when walking. In particular, inexperienced owners, who may not have the skill level to properly fit a conventional harness to their dog, can quickly correct the unwanted pulling behavior by using the preferred embodiments of the harness device of the present invention. Accordingly, one contemplated embodiment of the present invention includes a method for correcting a pulling dog by using the harness of FIGS. 1-7.

Making general reference to FIGS. 1-7, it will be appreciated that in some drawings some components may be omitted—this is done deliberately as a means to clarify the present invention without over-crowding the image. This preferred embodiment contemplates a harness device 10 for a domestic animal, such as a dog D. The harness device 10 includes a left connector 70 configured to arrange near the left shoulder of the dog, and a right connector 60 configured to arrange near the right shoulder of the dog when properly positioned on the animal.

A back strap 20 links the two connectors (left 70, right 60) and is therefore disposed intermediate to and coupled to each of the left connector and the right connector in a conventional manner that is well-understood by those skilled in this art. The connectors may be triangular, as depicted in the drawings, or a more conventional O-ring member, that is commonly used as connectors in dog harnesses, as would be understood by those skilled in this art.

A girth strap 30 includes a means for selectively opening or closing the strap, such as a buckle or clasp lock 100 consisting of a male prong that click locks into a female buckle. These are typically made of plastic and may also be called quick-release clasps-those skilled in the art will understand that many opening/closing devices would work to facilitate placing the harness on a dog. The girth strap 30 links between the left and right connectors (70 and 60) and is coupled to each respective connector in a conventional manner. The girth strap 30 is, therefore, disposed intermediate to and coupled to each of the left connector and the right connector.

The harness 10 further includes a chest strap; however, in this preferred embodiment the traditional single chest strap is replaced with a pair of cooperating and cross-laced free-moving straps. This pair of free-moving straps consists of a left free-moving strap 50 and a right free-moving strap 40. The left free-moving strap includes a left first end coupled to the right connector 60 in a conventional manner and a left second end. Importantly, the left second end is configured to pass through a center portion of the left connector 70. The left second end further is coupled to a left-leash coupler 90 in a conventional manner. The left-leash coupler 90 is configured larger than the center portion of the left connector 70 so that the left-leash coupler cannot pass through the center portion of the left connector. Further, the left-leash coupler 90 is configured to enable a conventional leash end attachment means to selectively couple to it as would be conventionally understood; however, in this preferred embodiment a double-ended leash would be used, as will be described in further detail, below.

The right free-moving strap 40, similar to the left free-moving strap, includes a right first end coupled to the left connector 70 in a conventional manner. An opposite right second end is configured to pass through a center portion of the right connector 60. And the right second end terminates and couples conventionally to a right-leash coupler 80. The right-leash coupler 80 is configured larger than the center portion of the right connector 60 so that the right-leash coupler cannot pass through the center portion of the right connector. The right-leash coupler 80 is configured to enable a conventional leash end attachment means to selectively couple to it as would be conventionally understood; however, in this preferred embodiment a double-ended leash would be used, as will be described in further detail below.

As would be understood by those skilled in this art, any combination of, or all, straps may include conventional means for adjustment, thus enabling the harness to be sized for many different dog shapes and further to enable proper fitment on a given dog. Accordingly, the harness device 10 contemplates that any at least one of the girth strap 30, the back strap 20, the left free-moving strap 50, or the right free-moving strap 40 further comprise a means for adjusting the length of that given strap, one contemplated means includes a conventional slip lock buckle 12 mechanism for adjusting the length of the corresponding strap. In the drawings, a slip lock buckle 12 is shown on the back strap 20, but it will be understood that this slip lock buckle 12 or other similar device can be positioned on each strap, as desired.

Figure 5:
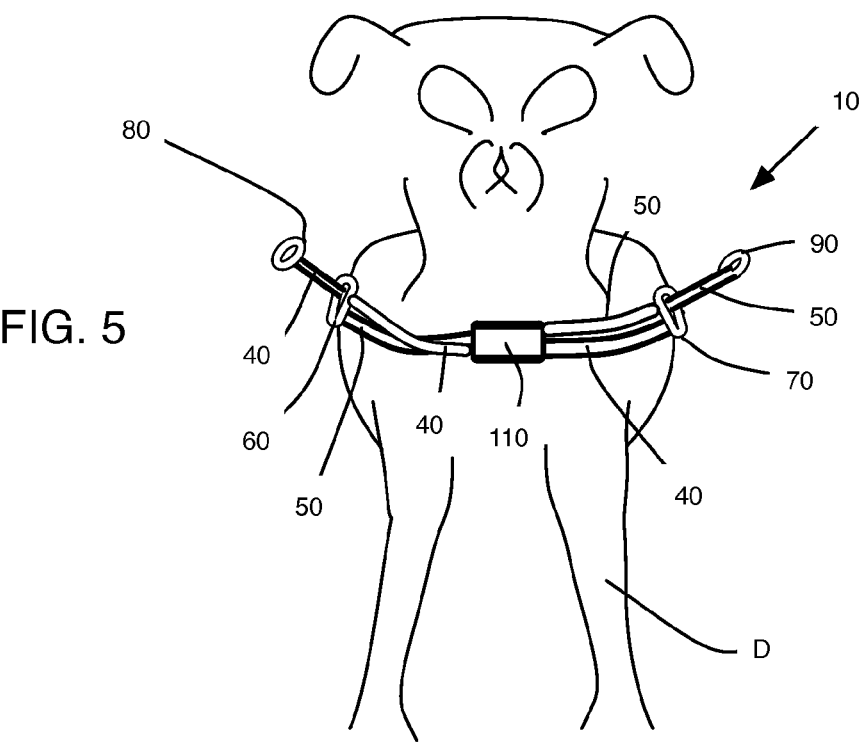
FIG. 5 is a front view of the harness of FIG. 1 arranged on a dog.
Figure 6:
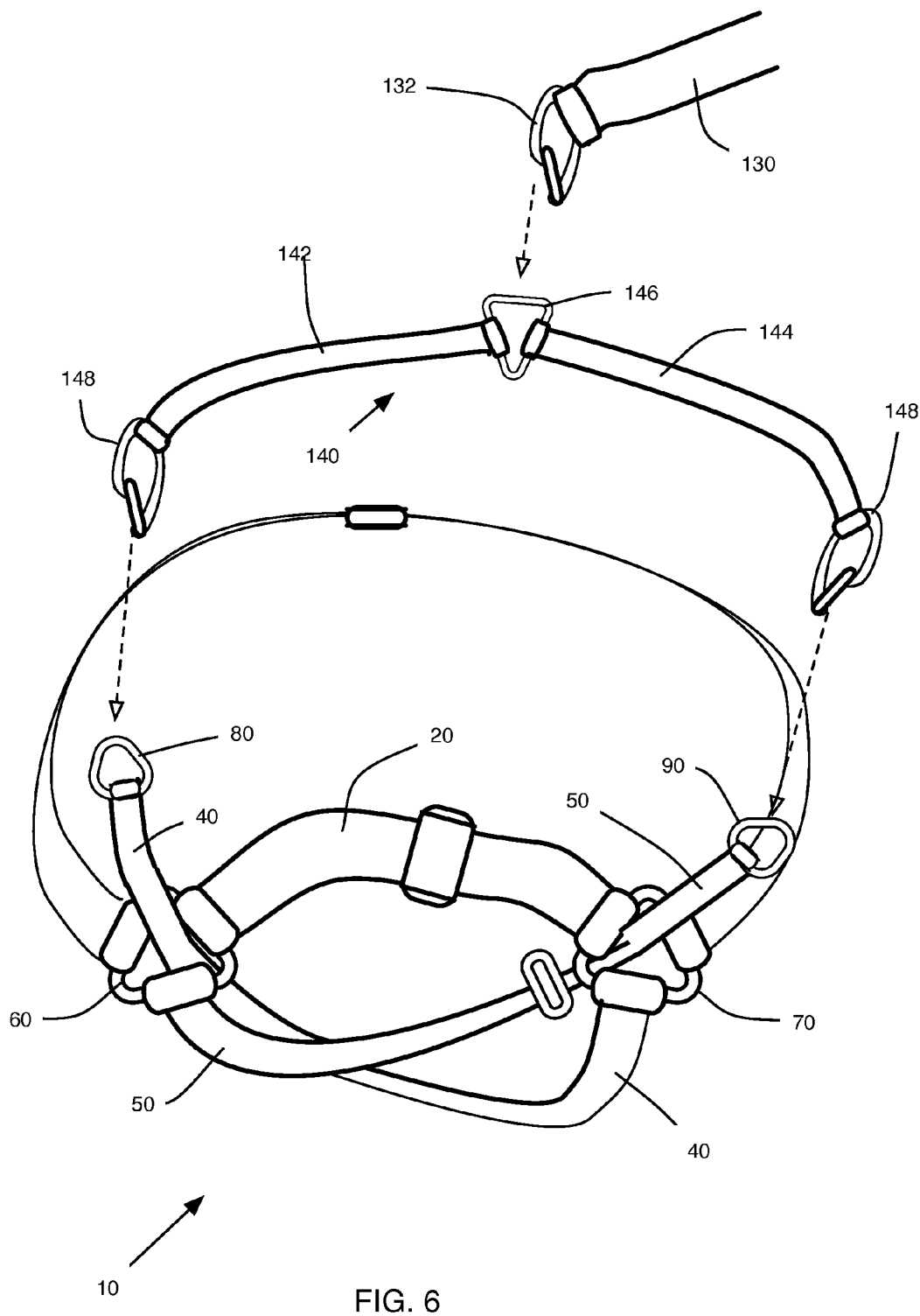
FIG. 6 is a front view of the harness of FIG. 1 on a single-ended leash.

To prevent a dog from becoming entangled in the pair of cooperating chest free-moving straps (left free-moving strap 50 and right free-moving strap 40), the harness may also include a guide member 110, which would position and otherwise be disposed over an intermediate portion of both the right free-moving strap and left free-moving strap, as shown, for example, particularly in FIG. 5. This guide 110 is simply a looped piece of fabric, ideally from a nylon blend that simply positions near the center of the dog's chest with each free-moving strap running through the center of the guide, and the guide allows each free-moving strap to easily slide back and forth. In one embodiment, the guide may be attached to one of the chest straps, such that it remains in the desired position but allows the chest strap to which it is attached and the other chest strap that runs there through to each independently easily slide back and forth.

For added safety and comfort to the dog, the harness 10 optionally includes corresponding over-travel barriers on each free-moving strap. This helps prevent unwanted over-tightening of the cooperating free-moving straps when the dog pulls. Accordingly, the harness device 10 includes a left over-travel band 52 disposed on an intermediate portion of the left free-moving strap 50. This band 52 is configured and sized so that it cannot pass through the center portion of the left connector 70. Similarly, the right free-moving strap 40 includes a corresponding right over-travel band (not shown in the figures). The right over-travel band cannot pass through the center portion of the right connector 60.

For best results to teach a dog not to pull on a leash, the harness device 10 contemplates utilizing a double-ended leash 120. A double-ended leash includes a clasp device on both ends. The opposite ends couple to the harness and the handler of the dog holds on to a center portion of the leash. Accordingly, the double ended leash has a first leash clasp 122 configured to selectively couple to the left leash coupler 90 and a second leash clasp 124 configured to selectively couple to the right leash coupler 80.

There are times when a dog-handler may desire to use a conventional single-ended leash 130 having a clasp 132 at one end of the leash. The harness device 10 can accommodate such a use by means of a linking band 140. The linking band includes a first linking end 144 configured to selectively couple by means of a clasp 148 to the left leash coupler 90 and a second linking end 142 configured to selectively couple to the right leash coupler 80 by means of a corresponding clasp 148. A center clasp 146 arranges and is disposed intermediate to the first linking end and second linking end. The center clasp 146 enables the clasp 132 of the single leash to position centrally relative to the left and right connectors on the dog.

One preferred and contemplated method of training a dog to walk without pulling includes utilizing the harness device 10 as just described above. Further, this method includes coupling a double-ended leash 120 to the harness and walking a dog that is wearing the harness.

FIGS. 1-6 show a harness having four distinct straps: a back strap 20, a girth strap 30 and the chest strap consisting of a pair of free-moving straps, and each set of straps is coupled to the left and right connectors; however, those skilled in the art will appreciate that the connectors can be replaced with other means of coupling the straps to each other, such as mechanically sewing the straps together and therefore omitting the connectors. Although in certain preferred embodiments the connectors 60 and 70 serve as guides through which a chest strap passes, and optionally can serve as the attachment point for the girth strap, back strap, and one end of the chest strap, in other contemplated embodiments these connectors can be optional by omitting the function of the connectors as attachment points for the girth, back and the first ends of the chest straps, but maintaining the connectors with passing-through means for each second end of each chest strap at the shoulders to permit the operation of the device as intended.

Figure 7:
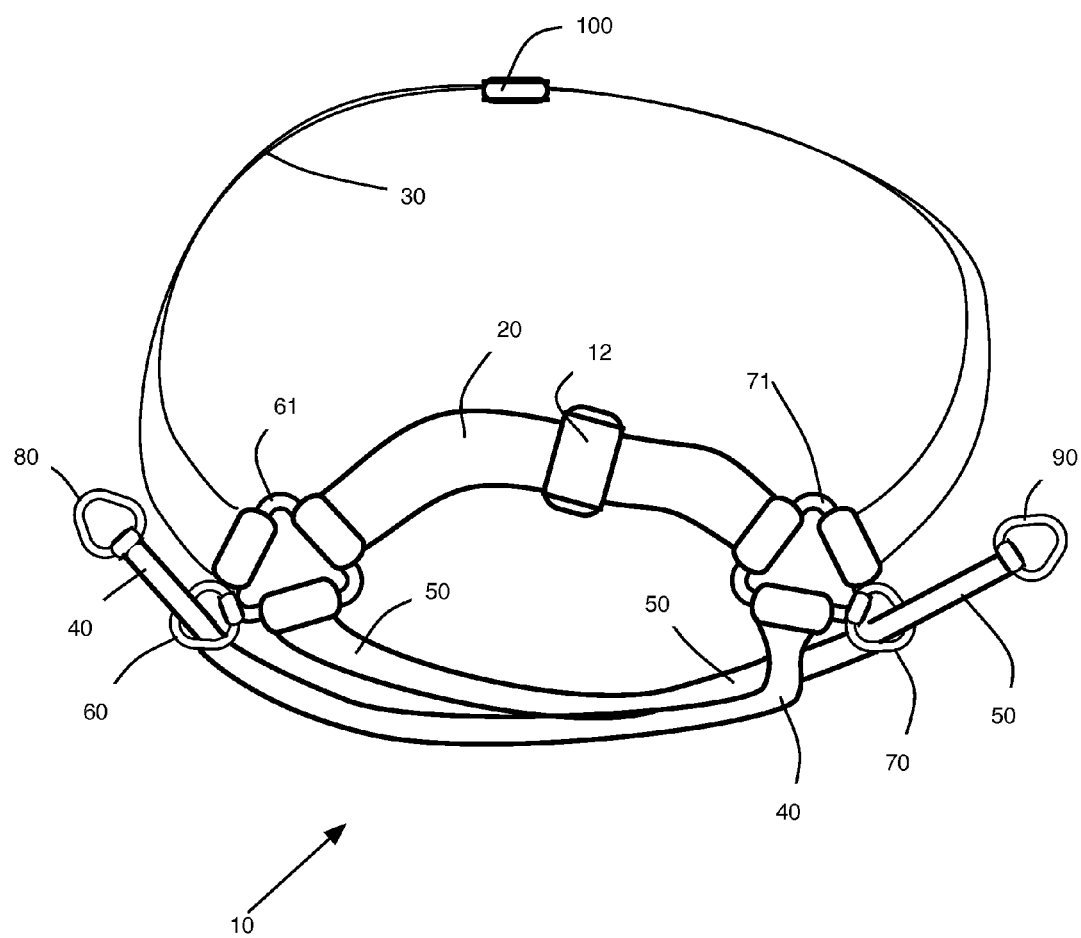
FIG. 7 is a front view of another preferred embodiment of a harness according to the present invention.

Accordingly, another preferred embodiment of the present invention, as FIG. 7 illustrates, includes the connectors being attached to supplemental connectors. One suitable supplemental connector is the illustrated O-ring or triangular connector ring, but another suitable supplemental connector (not shown in the figures) is the intersection point where two or more straps merge. It is well-understood in this art that a harness can be assembled by sewing straps directly to an adjacent strap and this invention contemplates such an assembly.

More specifically, another preferred embodiment includes a left connector 70, which can be connected directly to a strap, such as the back strap 20, or to a supplemental strap (not shown) that is in turn coupled directly to the girth strap, or back strap, or even the opposite right free-moving strap. In the embodiment of FIG. 7, the left connector 70 is coupled to a left supplemental connector 71. The coupling can be direct as shown in FIG. 7, or it can be through a supplemental strap between the connector and supplemental connector, or, in another embodiment, the connector is coupled at or near an end of another strap coupled to the supplemental connector such as the right first end of right free-moving strap 40. Each of the girth strap and the back strap also couple to the left supplemental connector. However, the right free-moving strap 40 passes through the center of the connector 70, not the supplemental connector 71 (see FIG. 7). Similarly, the right free-moving strap passes through the center of the right connector 60, which in turn is coupled directly to a strap or to the right supplemental connector 61 (as shown in FIG. 7, for example), or coupled at or near an end of another strap coupled to the supplemental connector such as the left first end of left free-moving strap 50. As noted above, in one embodiment, the connectors may be positioned at an angle, for example, a right angle, to the respective supplemental connector or strap to which it is coupled, such that the connector extends out from (i.e., the opening is perpendicular to) the shoulder or side of the dog to allow the chest strap to freely pass through it and not become blocked by pressure against the shoulder of the dog or by the connector flattened against the shoulder of the dog.

In another embodiment, the pair of chest straps, specifically the left and right chest straps, are slightly modified. For ease of explanation, this following description will assign the left chest strap with the modification, but those skilled in the art will appreciate that either the left or the right strap can be modified thusly; the left chest strap consists of two segments—a first strap member and a second strap member. An intermediate connecting guide member, such as an O-ring guide is disposed between the first strap member and the second strap member. Each segment is coupled to the intermediate connector guide. The intermediate connector guide is sized such that the right chest strap can pass freely through the center of the intermediate connector guide. Otherwise, the right chest strap member operates and functions as previously described herein. The segmented left chest strap consisting of the first and second strap and connecting guide, functions the same as previously described herein. Accordingly, the pair of free-moving and cooperating left and right chest straps are able to sit flatter and be worn more comfortably on the dog and slide back and forth easily and independently. In this variation, the chest strap without the intermediate connector guide would extend from one shoulder along the top of the chest strap with the connector up to the connector, pass through the connector, then extend behind the chest strap with the connector to the other shoulder.

Although the invention has been particularly shown and described with reference to certain embodiments, it will be understood by those skilled in the art that various changes in form and detail may be made without departing from the spirit and scope of the invention.

I claim:

1. A harness device for a domestic animal, the device comprising:
   (a) a left connector;
   (b) a right connector;
   (c) a back strap configured intermediate to each the left connector and the right connector;
   (d) a girth strap functionally coupled to the back strap; and
   (e) a chest strap comprising:
      (i) a left free-moving strap comprising a left first end functionally coupled to a right end of the back strap and a left second end configured to pass through a center portion of the left connector, the left second end coupled to a left-leash coupler whereby the left-leash coupler is configured larger than the center portion of the left connector so that the left-leash coupler cannot pass through the center portion of the left connector; and
      (ii) a right free-moving strap comprising a right first end functionally coupled to a left end of the back strap and a right second end configured to pass through a center portion of the right connector, the right second end coupled to a right-leash coupler whereby the right leash coupler is configured larger than the center portion of the right connector so that the right-leash coupler cannot pass through the center portion of the right connector.

2. The harness device of claim 1 wherein:
   (a) the left connector functionally couples to each of the back strap, the girth strap, and the right free-moving strap, and the left second end of the left free-moving strap is configured to pass through the center of the left connector; and
   (b) the right connector functionally couples to each of the back strap, the girth strap, and the left free-moving strap, and the right second end of the right free-moving strap is configured to pass through the center of the right connector.

3. The harness device of claim 1 wherein:
   (a) a left supplemental connector couples to at least two of the back strap, the girth strap, the right free-moving strap, and the left connector; and
   (b) a right supplemental connector couples to at least two of the back strap, the girth strap, the left free-moving strap, and the right connector.

4. The harness device of claim 1 wherein at least one of the girth strap, the back strap, the left free-moving strap, and the right free-moving strap further comprise a slip lock buckle mechanism for adjusting the length of the corresponding strap.

5. The harness device of claim 1 further comprising a guide member disposed over an intermediate portion of both the right free-moving strap and left free-moving strap.

6. The harness device of claim 1 further comprising the left free-moving strap further comprises a left over-travel band disposed on an intermediate portion of the left free-moving strap whereby the left over-travel band cannot pass through the center portion of the left connector.

7. The harness device of claim 1 further comprising the right free-moving strap further comprises a right over-travel band disposed on an intermediate portion of the right free-moving strap whereby the right over-travel band cannot pass through the center portion of the right connector.

8. The harness device of claim 1 further comprising a double ended leash comprising a first leash clasp configured to selectively couple to the left leash coupler and a second leash clasp configured to selectively couple to the right leash coupler.

9. The harness device of claim 1 further comprising a linking band comprising a first linking end configured to selectively couple to the left leash coupler and a second linking end configured to selectively couple to the right leash coupler and a clasp disposed intermediate to the first linking end and second linking end.

10. The harness device of claim 9 further comprising a single ended leash configured to selectively couple to the clasp.

11. The harness device of claim 1 wherein the girth strap further comprises a quick-release clasp lock.

12. A method of training a dog to walk without pulling, the method comprising:
   (a) providing a harness comprising:
      (i) a left connector;
      (ii) a right connector;
      (iii) a back strap disposed intermediate to and coupled to each the left connector and the right connector;
      (iv) a girth strap disposed intermediate to and coupled to each the left connector and the right connector; and
      (v) a chest strap comprising:
         ($\alpha$) a left free-moving strap comprising a left first end functionally coupled to the right connector and a left second end configured to pass through a center portion of the left connector, the left second end coupled to a left-leash coupler whereby the left-leash coupler is configured larger than the center portion of the left connector so that the left-leash coupler cannot pass through the center portion of the left connector; and (β) a right free-moving strap comprising a right first end functionally coupled to the left connector and a right second end configured to pass through a center portion of the right connector, the right second end coupled to a right-leash coupler whereby the right-leash coupler is configured larger than the center portion of the right connector so that the right-leash coupler cannot pass through the center portion of the right connector;

(b) coupling a double-ended leash to the harness; and (c) walking a dog that is wearing the harness.

13. A harness device for a domestic animal, the device comprising:

(a) a left connector and a left supplemental connector, the left connector connected to the left supplemental connector;

(b) a right connector and a right supplemental connector, the right connector connected to the right supplemental connector;

(c) a back strap configured intermediate to each the left supplemental connector and the right supplemental connector;

(d) a girth strap configured intermediate to each the left supplemental connector and the right supplemental connector; and (e) a chest strap comprising:

(i) a left free-moving strap comprising a left first end functionally coupled to a right end of the back strap and a left second end configured to pass through a center portion of the left connector, the left second end functionally coupled to a left-leash coupler whereby the left-leash coupler is configured larger than the center portion of the left connector so that the left-leash coupler cannot pass through the center portion of the left connector; and (ii) a right free-moving strap comprising a right first end functionally coupled a left end of the back strap and a right second end configured to pass through a center portion of the right connector, the right second end functionally coupled to a right-leash coupler whereby the right leash coupler is configured larger than the center portion of the right connector so that the right-leash coupler cannot pass through the center portion of the right connector.

14. The harness device of claim 13 wherein:

(a) the left connector being directly connected to the left supplemental connector; and (b) the right connector being directly connected to the right supplemental connector.

15. The harness device of claim 13 wherein:

(a) the left connector functionally couples to each of the back strap, the girth strap, and the right free-moving strap, and the left second end of the left free-moving strap is configured to pass through the center of the left connector; and (b) the right connector functionally couples to each of the back strap, the girth strap, and the left free-moving strap, and the right second end of the right free-moving strap is configured to pass through the center of the right connector.

16. The harness device of claim 13 wherein any at least one of the girth strap, the back strap, the left free-moving strap, and the right free-moving strap further comprise a slip lock buckle mechanism for adjusting the length of the corresponding strap.

17. The harness device of claim 13 wherein the girth strap further comprises a quick-release clasp lock.

* * * * *